United States Patent
Fleck et al.

(10) Patent No.: US 7,906,250 B2
(45) Date of Patent: Mar. 15, 2011

(54) HIGH-TEMPERATURE FUEL CELL SYSTEM AND METHOD FOR THE PRODUCTION OF CONTACTING ELEMENTS FOR SUCH A FUEL CELL SYSTEM

(75) Inventors: Robert Fleck, Adelsdorf (DE); Harald Landes, Rückersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1010 days.

(21) Appl. No.: 11/663,987

(22) PCT Filed: Sep. 28, 2005

(86) PCT No.: PCT/EP2005/054888
§ 371 (c)(1),
(2), (4) Date: Mar. 28, 2007

(87) PCT Pub. No.: WO2006/035048
PCT Pub. Date: Apr. 6, 2006

(65) Prior Publication Data
US 2007/0264539 A1    Nov. 15, 2007

(30) Foreign Application Priority Data
Sep. 30, 2004  (DE) .......................... 10 2004 047 733

(51) Int. Cl.
*H01M 4/64* (2006.01)
*H01M 4/66* (2006.01)

(52) U.S. Cl. ........ 429/519; 429/522; 429/517; 429/468; 429/479

(58) Field of Classification Search .................... 429/12, 429/31, 34, 232, 245, 519, 522, 517, 518, 429/468, 471, 479, 497; 252/520.2
See application file for complete search history.

(56) References Cited

U.S. PATENT DOCUMENTS

| | | | |
|---|---|---|---|
| 4,791,035 A | 12/1988 | Reichner | |
| 5,279,906 A | 1/1994 | Yoshimura et al. | |
| 2002/0025458 A1* | 2/2002 | Faville et al. | 429/13 |
| 2003/0036001 A1* | 2/2003 | James et al. | 429/232 |
| 2003/0096147 A1* | 5/2003 | Badding et al. | 429/30 |

FOREIGN PATENT DOCUMENTS

| | | |
|---|---|---|
| EP | 0 320 087 A | 6/1989 |
| EP | 0 320 087 B1 | 6/1989 |
| EP | 0 536 909 A | 4/1993 |
| EP | 0 536 909 B1 | 4/1993 |
| EP | 1 271 684 A | 1/2003 |
| EP | 1 271 684 A2 | 1/2003 |

OTHER PUBLICATIONS

PCT/ISA/237, English translation of these documents considered.
PCT/ISA/220, English translation of these documents considered.

* cited by examiner

*Primary Examiner* — Jennifer K Michener
*Assistant Examiner* — Heng M Chan
(74) *Attorney, Agent, or Firm* — Harness, Dickey & Pierce, P.L.C.

(57) ABSTRACT

Disclosed is a high-temperature fuel cell system including individual SOFC fuel cells which are in contact with each other to be electrically connected in parallel or in series. Contacting elements are provided, in at least one embodiment, that are suitable for the fuel cell system with a certain flexibility in addition to electrical conductivity for continuous operation. The contacting elements are provided, in at least one embodiment, between two fuel cells with an outer, metallically conductive jacket and a ceramic core. For example, ceramic felts can be enveloped by a nickel net by adequately shaping the same.

20 Claims, 2 Drawing Sheets

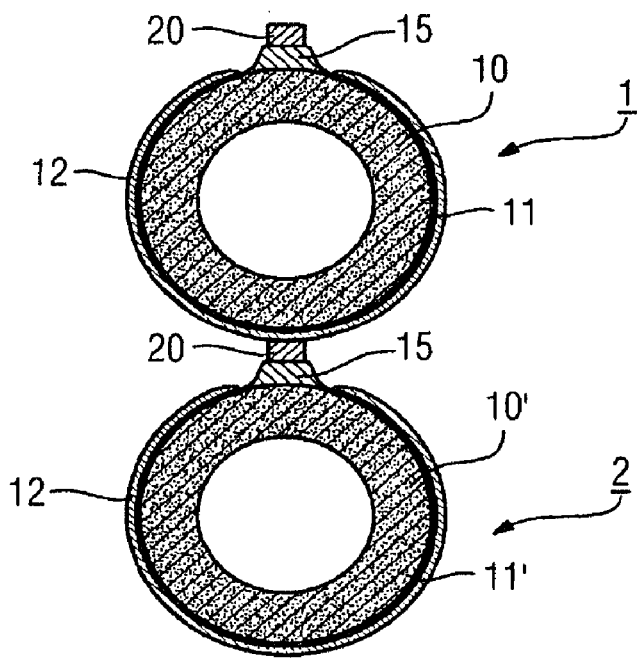
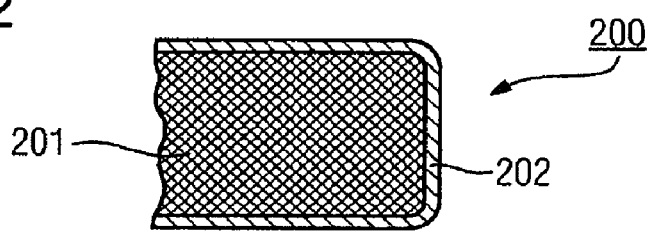
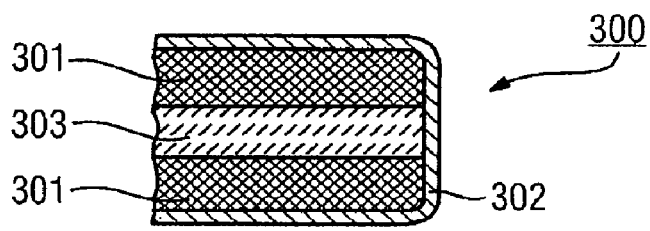
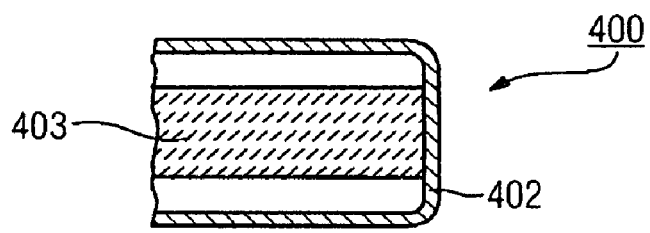

HIGH-TEMPERATURE FUEL CELL SYSTEM AND METHOD FOR THE PRODUCTION OF CONTACTING ELEMENTS FOR SUCH A FUEL CELL SYSTEM

PRIORITY STATEMENT

This application is the national phase under 35 U.S.C. §371 of PCT International Application No. PCT/EP2005/054888 which has an International filing date of Sep. 28, 2005, which designated the United States of America and which claims priority on German Patent Application number 10 2004 047 733.7 filed Sep. 30, 2004, the entire contents of which are hereby incorporated herein by reference.

FIELD

Embodiments of the invention generally relate to a high-temperature fuel-cell system comprising a plurality of individual fuel cells, which make contact with one another in order to be connected electrically in parallel and/or in series. Flexible and electrically conductive contact-making elements may be used for this purpose. Embodiments of the invention also generally relate to a method for production of contact-making elements for a fuel-cell system such as this.

BACKGROUND

In the prior, art, contact strips are used in order to make electrical contact with solid-ceramic fuel cells, connected in series or in parallel. The contact strips are, for example, applied along a tubular fuel cell to the interconnector that is already provided there, and in each case connect the cathode and anode of two individual fuel cells which are arranged one above the other (connected electrically in series). A plurality of adjacent fuel cells can be electrically connected to one another by way of one contact strip, in order to connect them in parallel (electrical connection in parallel).

Known contact-making elements which have been used in the past for electrical connection of tubular high temperature fuel cells are composed of nickel felt strips, which include a multiplicity of fine nickel fibers with a thickness of only a few tens of micrometers, and are therefore both flexible and compressible. In the compressed state, the nickel felt strips have a width of about 6 mm, and a height of 3 to 4 mm.

The height of the contact strip during its system is governed by the distance which must be bridged by the contact between two cells. This is described in detail, for example, in EP 0 320 087 B1 and in EP 0 536 909 A1. For correct use, the nickel felts are adhesively bonded to the interconnector on the one hand and to the anode on the other hand, by way of a nickel paste. The paste is sintered at the operating temperature of the high-temperature fuel cells.

The production of the latter nickel felts is time-consuming, and associated with a large number of manufacturing steps. This incurs high costs. Furthermore, one undesirable characteristic of these contact strips is that the nickel felts can be resintered during long-term operation, and thus the cell contact becomes rigid as a result of loss of flexibility and elasticity. This can result in the contacts being torn off, and thus in the fuel-cell system losing power, in the event of major temperature fluctuations.

SUMMARY

At least one embodiment of the invention provides a fuel-cell system comprising a multiplicity of individual fuel cells, in which the contact for electrical connection of the individual cells in parallel or in series is improved. At least one further embodiment of the invention specifies production methods for contact-making elements such as these.

The subject matter of at least one embodiment of the invention is directed to a contact-making element in which the electrical contact is formed from a metallic mesh, a metallic knitted fabric, or expanded metal into which a ceramic inner core is incorporated. In particular, a ceramic felt, mesh, knitted fabric or ceramic cord is incorporated as the inner core. The use of ceramic fibers with an additive means that the inner core is flexible, and this is particularly advantageous for the specific purpose.

At least one embodiment of the invention therefore advantageously allows the metallic and ceramic materials, with their respective positive material characteristics, to be used in conjunction with one another, thus allowing long-term, flexible contact to be made with high-temperature fuel cells. In this case, both the forces between two fuel cells and the forces along an individual tubular fuel cell, which may have a length of up to 1800 mm and may therefore have geometric distortion, can be absorbed.

As already mentioned, a felt is advantageously used as the ceramic core of the contact-making element. The ceramic felt is preferably composed of aluminum oxide ($Al_2O_3$), possibly with components of silicon oxide ($SiO_2$) or so-called molite. Nickel or a nickel alloy is used in a known manner as the material for the metallic sheath.

In the case of at least one embodiment of the invention, the object of the metallic sheath is to pass the electric current on from cell to cell without any significant losses, and to ensure the mechanical cohesion of the cell assembly formed, for example, from 3×8=24 cells. In contrast, the ceramic felt acts as a flexible buffer between the cells when the SOFC is in operation, and in the event of thermally induced deformation of the cell assembly.

At least one embodiment of the invention has the advantage that the ceramic core cannot be sintered, in contrast to nickel woven fabric, at the high operating temperatures of the fuel cell of about 1000° C. Furthermore, the ceramic core between the metal connectors can act as sintering protection for the nickel components in the contact strip, and additionally as a flexible spacer as well. The electric current is carried by the electrically conductive nickel while, in contrast, the electrically insulating ceramic core has no current-carrying function.

BRIEF DESCRIPTION OF THE DRAWINGS

Further details and advantages of the invention will become evident from the following description of the figures of example embodiments in conjunction with the patent claims. In the figures:

FIG. 1 shows a detail of a fuel-cell system with the cell contact between two individual fuel cells, according to the prior art, FIGS. 2 and 3 show two example embodiments for arrangements with an outer nickel mesh and an inner $Al_2O_3$ felt, FIG. 4 shows an example embodiment with a rigid ceramic core.

DETAILED DESCRIPTION OF THE EXAMPLE EMBODIMENTS

Figure 5:
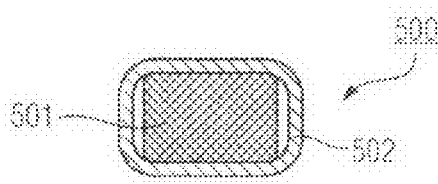
FIG. 5 and FIG. 6 show two alternative configurations of contact-making elements.

FIG. 1 shows an arrangement with two tubular fuel cells 1, 2, corresponding to the prior art. 10 and 10' denote sintered cathode tubes, on which individual functional layers are located in order to form the fuel cell. Functional layers such as these are at least an electrolyte 11 on the one hand and an anode 12 on the other hand. Intermediate layers can also be provided, but are not illustrated in detail in FIG. 1.

Since a large number of individual cells must be electrically connected to one another in order to achieve sufficient voltages and currents, the individual cells are, for example, connected in series with one another. For this purpose, the cathode of a first cell must in each case make contact with the anode of a second cell. For this purpose, a so-called interconnector 15 is located on the cathode tube 10, in a narrow area which is not covered by the electrolyte 11 or by the anode 12. A separate contact element 20 is fitted to the interconnector 15, in order to make contact between the cell 10 and the next cell 10'.

Conventional tubular fuel cells have a diameter of, for example, 22 mm, with the cathode tube having a thickness of 2 mm. The cathode tubes are about 1800 mm long, and are closed at one end. The interconnector 15 is located on the cathode tube 10, as a narrow strip with a thickness of about 100 μm. The electrolyte 11 and the anode 12 likewise have a thickness in the region of about 100 μm.

For correct connection of two fuel cell tubes 10 and 10', the contact 20 must have a thickness of about 3 mm. Since the fuel-cell arrangement operates at temperatures in the region of 1000° C., the materials must be matched to one another, particularly in terms of their coefficients of expansion, in order to ensure adequate robustness. This does not apply to the nickel used for the ceramic components. The nickel contacts that are normally used according to the prior art must therefore be elastic and flexible up to a certain extent, and this is made possible by their structure, for example of the knitted fabric.

FIG. 2 shows a contact 200 which contains a ceramic felt 201 as the core, and is provided with a nickel sleeve 202. The ceramic felt is advantageously composed of aluminum oxide ($Al_2O_3$) with additives of silicon oxide ($SiO_2$) or molite. The nickel protection 202 which is arranged around the felt 201 may, for example, be a mesh or a knitted fabric.

The knitted fabric may have a porosity of >80% with a wire thickness of between 50 μm and 150 μm.

The contact 200 conducts electrons, is thermally stable and is sufficiently gas-permeable.

Instead of using nickel as the material for the protective sleeve, it is also possible to use a nickel alloy, which is likewise available in the form of wire. Wires such as these may also be composed of a nickel alloy, in particular a two-component alloy with nickel as the basic metal and with a metallic secondary component. However, multiple-component alloys having a plurality of secondary components are also possible.

In particular, secondary components for the nickel alloy may include the metals copper (Cu), chromium (Cr), cobalt (Co) or titanium (Ti), or their oxides. The total component of the secondary components should not exceed 30% by weight.

In FIG. 3, the ceramic core 301 of a contact-making element 300 is composed of a fixed ceramic part 303, which is covered on both sides by a flexible nickel layer 302, in particular the felt shown in FIG. 2.

As shown in FIG. 4, it is also possible for the fixed ceramic part 403 of a contact-making element 400 to be directly surrounded by the flexible nickel mesh 402. In this case, in its vertical area in FIG. 5, the nickel mesh 402 is used to absorb forces and to ensure flexibility.

Figure 6:
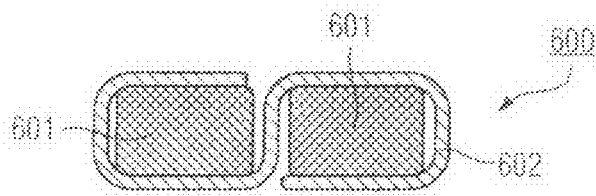

FIGS. 5 and 6 show two alternative embodiments of contact-making elements 500 and 600. In this case, as shown in FIG. 5, an $Al_2O_3$ felt 501 can be completely surrounded by the nickel knitted fabric/mesh 502. In contrast, as shown in FIG. 6, the mesh 602, as a molding, forms holders for the ceramic felts 601, 601'.

The described arrangement combines the advantages of a ceramic material on the one hand with the advantages of a metallic material on the other hand. Contact-making elements produced in this way are more suitable for making contact with two tubular fuel cells than the contact strips used in the prior art. In particular, even in the event of frequent temperature fluctuations, undesirable sintering processes, which are normally associated with material becoming brittle, and thus causing deterioration of the elasticity characteristics can be effectively avoided.

Figure 7:
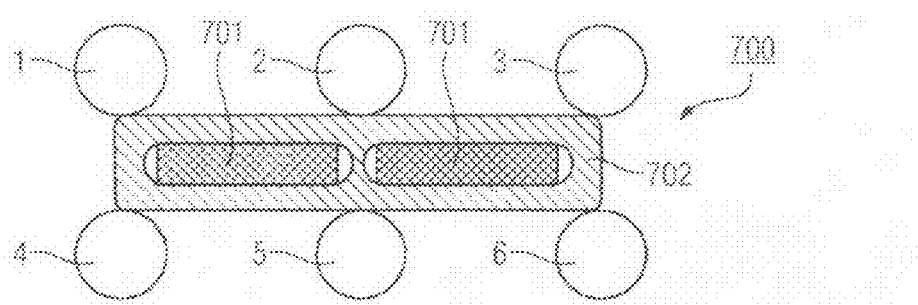
FIG. 7 shows an arrangement comprising six tubular fuel cells.

FIG. 7 shows an arrangement comprising six tubular fuel cells, which are each connected in pairs, in series. The fuel cells 1 to 6 are indicated. A compact contact structure 700 is illustrated between the fuel cells, composed of individual internal $Al_2O_3$ parts 701, which are positioned at a suitable lateral point and are surrounded by a nickel mesh 702. A series circuit comprising the cells 1/4, 2/5 and 3/6, as well as a parallel circuit comprising the cells 1/2/3 and 4/5/6 are therefore provided over an area.

Figure 8:
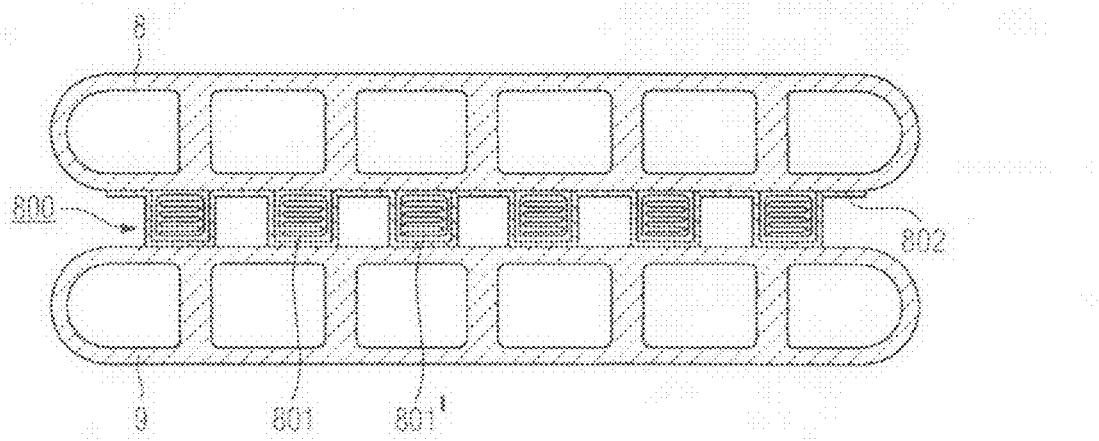
FIG. 8 shows an alternative embodiment to that shown in FIGS. 2/3, specifically for a so-called HPD (High Power Density) fuel-cell system.

FIG. 8 shows two so-called HPD fuel cells 8 and 9. HPD fuel cells such as these comprise a flat sintered body, which may have a planar or corrugated surface, in which, for example, six or eight individual inner tubes are incorporated. The output power in this case is particularly high (high power density) in comparison to individual tubes, as a result of the fuel gas being supplied in a preferred manner on the one hand, and gas being supplied from the air on the other hand.

A contact-making element 800, which is composed in places of individual $Al_2O_3$ felts 801, 801', each with metal meshes 802 arranged in a meandering shape around them, is located between the two HPD fuel cells 8 and 9.

The latter arrangement allows two HPD fuel cells 8 and 9 to be connected to one another in an electrically reliable and mechanically robust manner. No faults occur even during long-term operation at high temperatures.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:
1. A high-temperature fuel-cell system, comprising:
a plurality of individual fuel cells; and
at least one flexible contact-making element to electrically connect the fuel cells with one another at least one of in parallel and in series, the at least one flexible contact-making element including a ceramic core and a sleeve of a metallic conductive material around the ceramic core, wherein the metallic conductive material is in the form of at least one of a mesh and a knitted fabric.

2. The high-temperature fuel-cell system as claimed in claim 1, wherein the at least one flexible contact-making element conducts electrons, is thermally stable and is gas-permeable.

3. The high-temperature fuel-cell system as claimed in claim 1, wherein the ceramic core is a felt.

4. The high-temperature fuel-cell system as claimed in claim 1, wherein the ceramic core is a mesh.

5. The high-temperature fuel-cell system as claimed in claim 1, wherein the ceramic core is a knitted fabric.

6. The high-temperature fuel-cell system as claimed in claim 1, wherein the ceramic core is a cord.

7. The high-temperature fuel-cell system as claimed in claim 3, wherein the felt is composed of ceramic fibers and at least one additive.

8. The high-temperature fuel-cell system as claimed in claim 1 wherein the metallic conductive sleeve is in the form of the mesh, and the mesh is composed of at least one of nickel and a nickel alloy.

9. The high-temperature fuel-cell system as claimed in claim 1, wherein the metallic conductive sleeve is in the form of the knitted fabric, and the knitted fabric is composed of at least one of nickel and a nickel alloy.

10. The high-temperature fuel-cell system as claimed in claim 8, wherein the nickel alloy is a two-component alloy that includes a primary and a secondary metallic component, or a multiple-component alloy that includes the primary metallic component and a plurality of secondary metallic components.

11. The high-temperature fuel-cell system as claimed in claim 10, wherein the secondary metallic component or the plurality of secondary metallic components is at least one element from the group consisting of copper, chromium, cobalt, and titanium.

12. The high-temperature fuel-cell system as claimed in claim 10, wherein the secondary metallic component of the two-component alloy is $\leqq 30\%$ by weight of the nickel alloy, or
the plurality of secondary metallic components of the multiple-component alloy are, collectively, $\leqq 30\%$ by weight of the nickel alloy.

13. The high-temperature fuel-cell system as claimed in claim 1, wherein the knitted fabric has a porosity of $>80\%$, with a wire thickness of between 50 µm and 150 µm.

14. The high-temperature fuel-cell system as claimed in claim 4, wherein the mesh of the ceramic core is composed of ceramic fibers and at least one additive.

15. The high-temperature fuel-cell system as claimed in claim 5, wherein the knitted fabric of the ceramic core is composed of ceramic fibers and at least one additive.

16. The high-temperature fuel-cell system as claimed in claim 6, wherein the cord of the ceramic core is composed of ceramic fibers and at least one additive.

17. The high-temperature fuel-cell system as claimed in claim 2, wherein the metallic conductive sleeve is in the form of the mesh, and the mesh is composed of at least one of nickel and a nickel alloy.

18. The high-temperature fuel-cell system as claimed in claim 2, wherein the metallic conductive sleeve is in the form of the knitted fabric, and the knitted fabric is composed of at least one of nickel and a nickel alloy.

19. The high-temperature fuel-cell system as claimed in claim 9, wherein the nickel alloy is a two-component alloy that includes a primary and a secondary metallic component, or a multiple-component alloy that includes the primary metallic component and a plurality of secondary metallic components.

20. The high-temperature fuel-cell system as claimed in claim 1, wherein the sleeve of the metallic conductive material is coaxially around the ceramic core.

* * * * *